(12) United States Patent
Urashima

(10) Patent No.: US 8,200,571 B2
(45) Date of Patent: Jun. 12, 2012

(54) MARGIN TRADING SYSTEM, COMPUTER PROGRAM AND STORAGE MEDIUM

(75) Inventor: Shin-ichiro Urashima, Tokyo (JP)

(73) Assignee: Central Tanshi FX Co., Ltd., Tokyo (JP)

( * ) Notice: Subject to any disclaimer, the term of this patent is extended or adjusted under 35 U.S.C. 154(b) by 190 days.

(21) Appl. No.: 12/605,595

(22) Filed: Oct. 26, 2009

(65) Prior Publication Data

US 2010/0042532 A1 Feb. 18, 2010

Related U.S. Application Data

(63) Continuation of application No. PCT/JP2008/057878, filed on Apr. 23, 2008.

(30) Foreign Application Priority Data

Apr. 27, 2007 (WO) .................. PCT/JP2007/059214

(51) Int. Cl.
*G06Q 40/00* (2012.01)
(52) U.S. Cl. .......................................................... 705/37
(58) Field of Classification Search ................ 705/35–37
See application file for complete search history.

(56) References Cited

U.S. PATENT DOCUMENTS

| | | | | |
|---|---|---|---|---|
| 7,577,601 | B1 * | 8/2009 | Rademacher et al. | 705/36 R |
| 7,822,660 | B1 * | 10/2010 | Donoho et al. | 705/35 |
| 2002/0077947 | A1 * | 6/2002 | Ward et al. | 705/36 |
| 2002/0178102 | A1 * | 11/2002 | Scheinberg et al. | 705/37 |
| 2006/0265296 | A1 * | 11/2006 | Glinberg et al. | 705/35 |

FOREIGN PATENT DOCUMENTS

| | | |
|---|---|---|
| JP | 2003-099610 | 4/2003 |
| JP | 2005-032049 | 2/2005 |
| JP | 2006-189982 | 7/2006 |
| JP | 2006-268557 | 10/2006 |

* cited by examiner

*Primary Examiner* — Olabode Akintola
(74) *Attorney, Agent, or Firm* — Fitzpatrick, Cella, Harper & Scinto

(57) ABSTRACT

Extensibility of a margin trading system is provided for and improvement of processing quality can be achieved easily. The margin trading system comprises a plurality of processing unit for receiving and processing order information from a plurality of trading terminals, a calculation unit for calculating a second sum value based on a first sum value which is the sum value of the order information received within a predetermined duration by each processing unit, an ordering unit for ordering each processing unit such that at least one of the first sum value is not less than the threshold value when the second sum value is not less than the threshold value and a cover-ordering unit for making a covering order to a transaction-covering bank terminal.

11 Claims, 10 Drawing Sheets

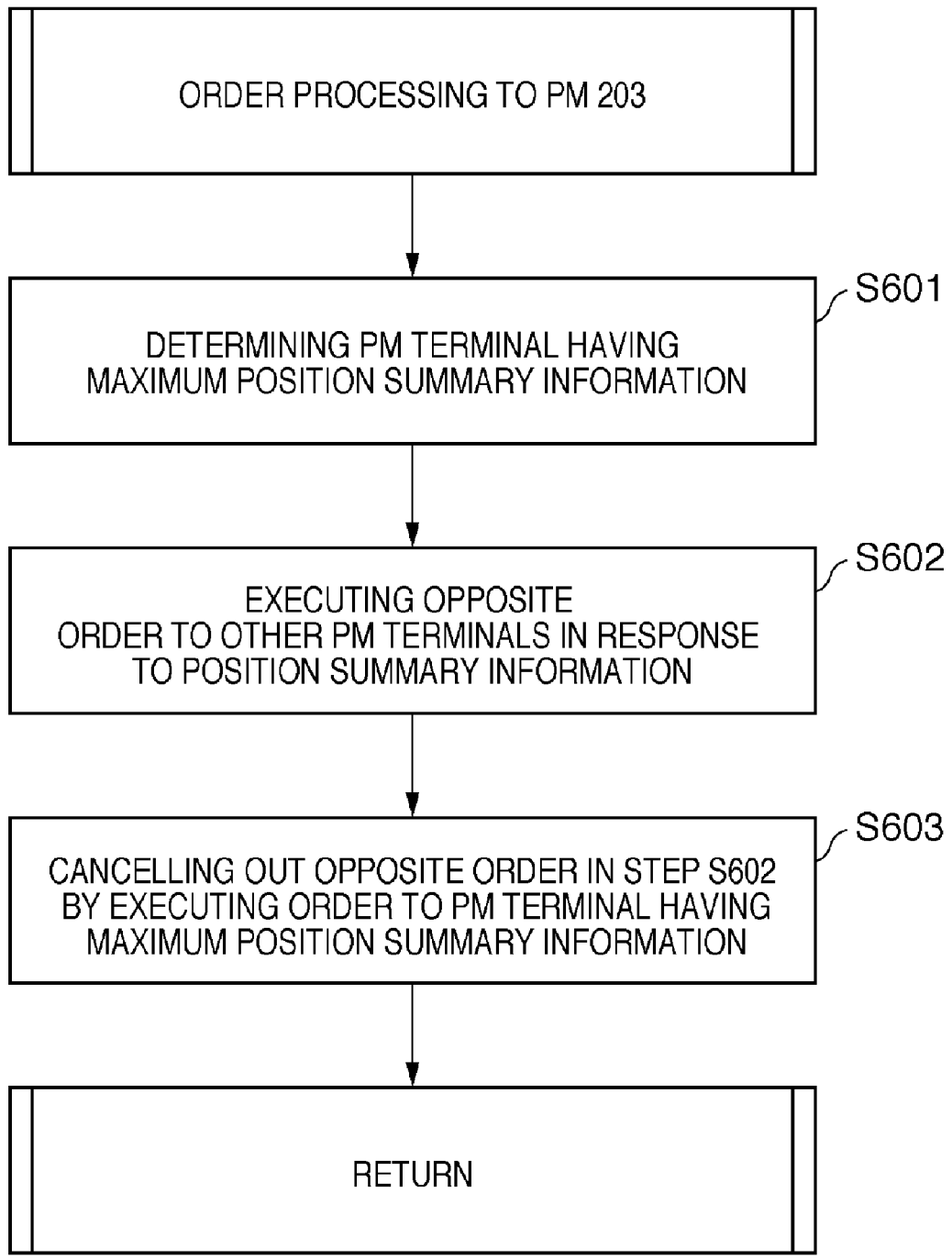

FIG. 7A

| 701 | 702 POSITION SUMMARY INFORMATION | 703 NETWORK SUMMARY INFORMATION | 704 Pth |
|---|---|---|---|
| PM-1 | +10 | +60 | +50 |
| PM-2 | +10 | | |
| PM-3 | +40 | | |

FIG. 7B

| | POSITION SUMMARY INFORMATION | NETWORK SUMMARY INFORMATION | Pth |
|---|---|---|---|
| PM-1 | 0 | +60 | +50 |
| PM-2 | 0 | | |
| PM-3 | +60 | | |

MARGIN TRADING SYSTEM, COMPUTER PROGRAM AND STORAGE MEDIUM

This application is a continuation of PCT Application No. PCT/JP2008/057878 filed Apr. 23, 2008, which in turn claims benefit of PCT Application No. PCT/JP2007/059214 filed Apr. 27, 2007.

TECHNICAL FIELD

The present invention relates to a margin trading system, a computer program and storage media.

BACKGROUND ART

Recently, margin trades, that is the handling of loans, funds or foreign exchange and the like on behalf of financial organizations or individual investors, has become popular in the financial products market. Distinct from other exchange trading where funds for the full amount of the trade is required up front, margin trades are executed with only a fraction of the full value placed on deposit; that is, the trade is said to be executed on margin.

In such margin trades, the margin trading company receives an order from the customer and executes the trade. In response to the order received from the customer, at this time, the margin trading company sends a covering order to a bank that covers transactions (hereinafter, transaction-covering bank).

The purpose of this covering order is to maintain the net position of the margin trading company so as to be flat. For example, when the margin trading company receives an order from the customer to purchase $1M and to sell $0.9M, the net position of the company is $0.1M ($1M-$0.9M)(i.e., a $0.1M buying position from the customer and a $0.1M selling position from the margin trading company) and the margin trading company also bears the risk of fluctuations in currency exchange values.

In order to cancel or reduce this risk, the margin trading company can make their position to be approximately flat by sending a covering order to buy a certain rate amount (here for simplicity $0.1M).

A system structure to realize such margin trading is shown in FIG. 8. In FIG. 8, the system 1000 for margin trading is connected to a transaction-covering bank terminal 1010 and a user terminal 1020.

The system 1000 for margin trading receives 'selling order' or 'buying order' from the user terminal 1020. A lower application layer 1003 of the system 1000 for margin trading receives the selling or buying orders. The lower application layer 1003 is composed of a plurality of lower application layer components (dedicated information processing terminals) and each lower application component notifies the business logic 1002 of the received order information.

The business logic 1002 is composed of a plurality of business logic application components (dedicated information processing terminals) and synchronizes between components as to the order information, notification of which came from a corresponding lower application component. Here, this synchronization between components is realized by writing to a common database each time a given component receives an order. That is, order information received by all components is managed in an integrated fashion in this database. By this operation, the position in system 1000 for margin trading can be determined. For instance, in the above example, the position can be determined to be "selling position of $0.1M."

After synchronizing the order information, the business logic 1002 sends the covering order to the terminal 1010 of the transaction-covering bank to make the position flat in response to the position information. If the current position is "selling position of $0.1M", then "buying order of $0.1M" is sent.

As described above, in the existing system 1000 for margin trading, by summing up the orders from a plurality of user terminals 1020, the covering order is conducted to make the net position to be flat.

Japanese Patent Laid-Open No. 2006-189982 discloses a margin trading system.

DISCLOSURE OF THE INVENTION

Problem to be Solved by the Invention

In the existing system 1000 for margin trading, when the order is received from the user terminal 1020, this order information is written in the database and after writing is completed, receipt of the order is sent to the user terminal 1020. That is, the order of the user is not complete until the writing in is complete. Naturally, as financial trading requires prompt action, the immediacy of order processing is a very important factor.

Generally, methods of improving immediacy tend to increase the number of lower application components or business logic application components. However, as the number of components increases, the number of components to which the user terminal 1002 must access, and the number of components writing to the database also increases. As a result, a longer amount of time is required to complete the database write and the response time to the user terminal is degraded. Further, if the locations of the components are geographically dispersed, a longer amount of time is required to complete the database write due to the distance.

Thus, when the number of components is increased or the locations of the components are dispersed a problem arises in that the response time for the synchronization process is degraded.

As mentioned above, in the existing system for margin trading, due to the limitation of extensibility of synchronization, it is difficult to improve the quality of the system.

Accordingly, it is an object of the present invention to improve the extensibility of the system for margin trading as well as the quality and ease of processing.

Measure to Resolve the Problem

According to an aspect of the present invention, a margin trading system being connectable to a plurality of trading terminals and a transaction-covering bank terminal via a network comprising, a receiving unit operable to receive order information from the plurality of trading terminals, a plurality of processing units respectively operable to execute acknowledgement receipt of the received order information, a calculation unit operable to obtain a first sum value which is the sum value of the order information received within a predetermined duration by each processing unit and to calculate a second sum value based on the obtained first sum values, an ordering unit operable to send an order to the respective processing units so that at least one of the first sum values becomes no less than a threshold value, when the second sum value is not less than the threshold value, and a cover-ordering unit operable to conduct covering orders to the transaction-covering bank terminal, wherein the processing unit having the first sum value no less than the threshold value instructs the cover-ordering unit to conduct the covering order, the cover-ordering unit conducts the covering order in response to the instruction, and each of the plurality of processing units includes an external storage device and conducts acknowledgement receipt based on the completion of write of the received order information to the external storage device.

According to another aspect of the present invention, a margin trading system being connectable to a plurality of trading terminals and a transaction-covering bank terminal via a network comprising, a receiving unit operable to receive order information from the plurality of trading terminals, a plurality of processing units respectively operable to execute acknowledgement receipt of the received order information, a calculation unit operable to obtain a first sum value which is the sum value of the order information received within a predetermined duration by each processing unit and to calculate a second sum value based on the obtained first sum values, a covering order instructing unit operable to instruct a cover-ordering unit to conduct the covering order when the second sum value is not less than the threshold value, a cover ordering unit operable to send a covering order to the transaction-covering bank terminal, and an ordering unit operable to order each processing unit such that the first sum value of a first processing unit among the plurality of the processing units becomes equal to the second sum value after a covering order and the first sum values of the other processing units other than the first processing unit is canceled, wherein each of the plurality of processing units includes an external storage device and conducts acknowledgement receipt based on the completion of write of the received order information in the external storage device.

Effect of the Invention

According to the present invention, the extensibility of the system for margin trading and improvement of the quality of processing can be easily achieved.

BRIEF DESCRIPTION OF DRAWINGS

FIG. 6A is a flowchart showing an example of the processing executed in NPC 206 according to the embodiment of the present invention.

FIG. 7A shows an example of the information used in each PM terminal according to the embodiment of the present invention.

FIG. 7B shows an example of the information used in each PM terminal according to the embodiment of the present invention.

BEST MODE FOR CARRYING OUT THE INVENTION

An embodiment of the present invention will now be explained with reference to the attached drawings.

Figure 1:
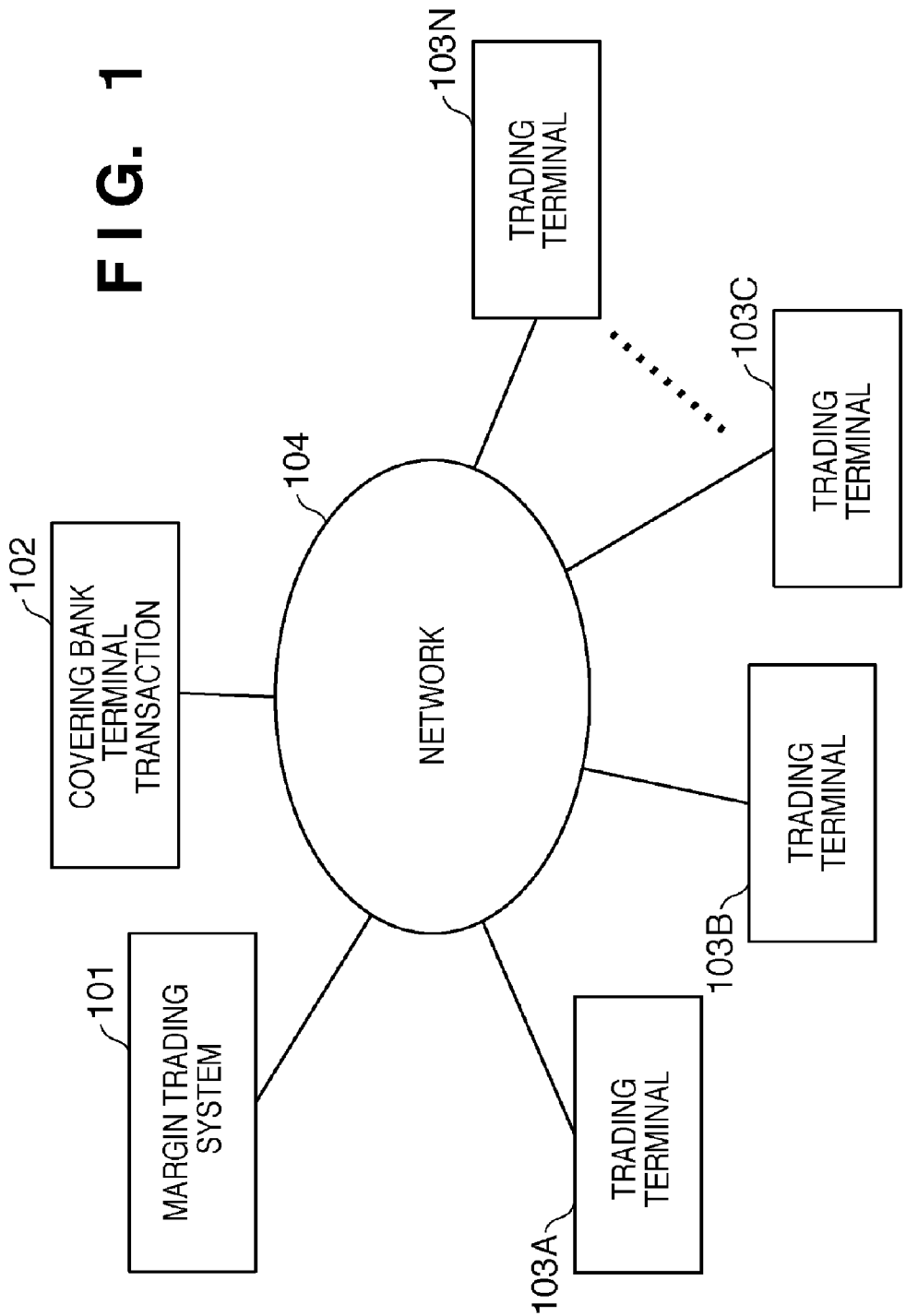
FIG. 1 is a diagram showing a margin trading system corresponding to an embodiment of the present invention.

FIG. 1 shows a general construction of the margin trading system according to an embodiment of the present invention; here it includes a margin trading system 101 for conducting the trading, a terminal 102 of a transaction-covering bank for issuing a covering order, and a trading terminals 103(A-N) for issuing the order to the system for margin trading and used by the customers such as finance companies and connected to the network such as the Internet. The trading terminals 103 comprise commodity-type personal computers.

The order information issued by the trading terminals 103 to the system 101 for margin trading includes a brand name showing the subject of the order, a segment identifying selling or buying, a yearly interest rate or unit price, an order amount (or order money amount, same hereinafter) and other trading conditions. This order information is provided from the system 101 for margin trading to respective trading terminal 103 and displayed on the display of respective trading terminals.

Figure 2:
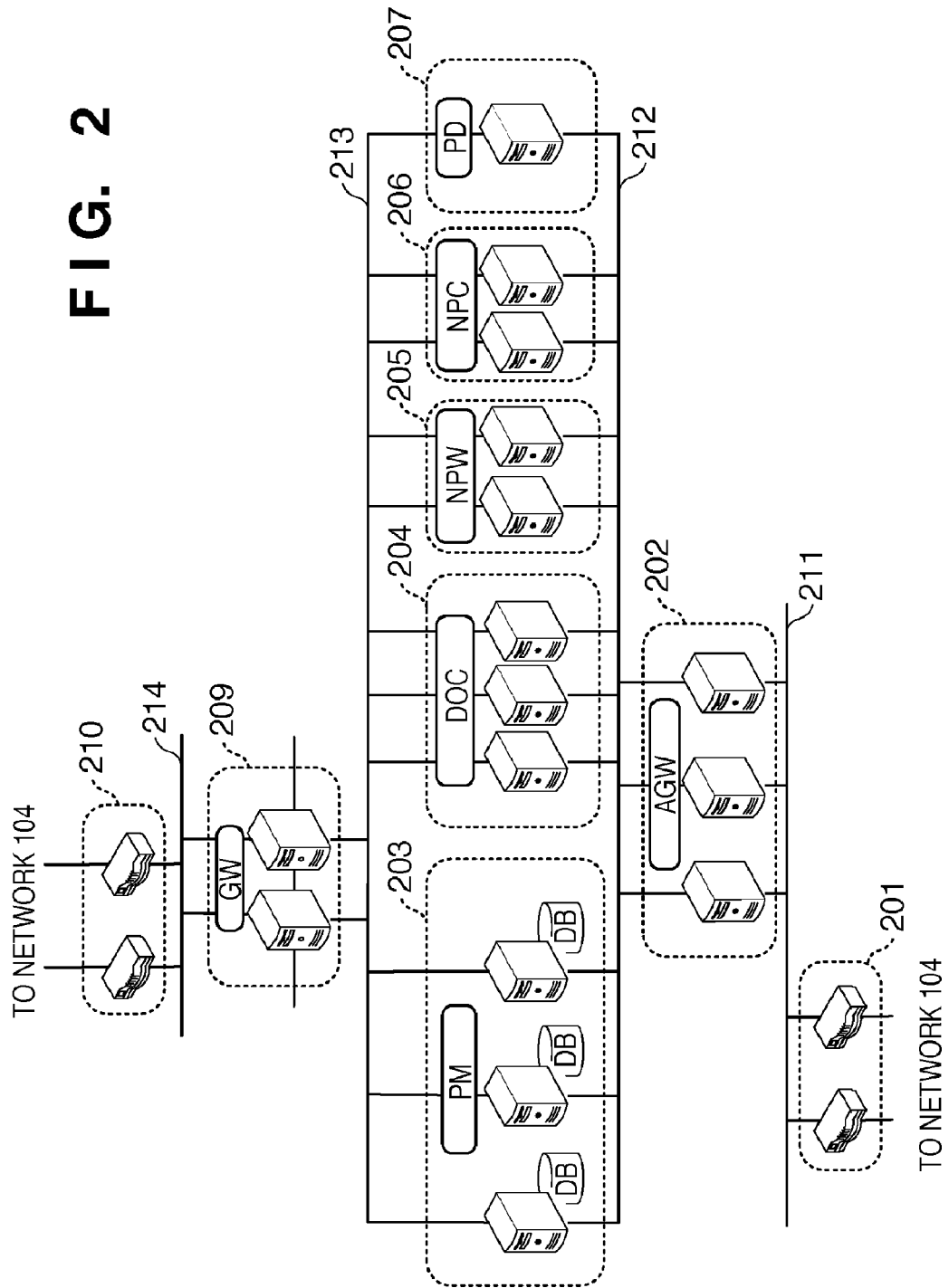
FIG. 2 is a diagram showing an example of system for margin trading corresponding to the embodiment of the present invention.

Next, the hardware construction of the system 101 for margin trading will be explained in detail with reference to FIG. 2. FIG. 2 is a diagram showing a hardware construction of the system for margin trading. The system 101 for margin trading has various types components, including routers 201, 210 and information processing terminals.

The router 201 is provided to allow connection to the trading terminal of the customer via the network 104. The router 201 is connected through an Application Service Provider Gateway 202 and a bus 211. An Application Service Provider Gateway (AGW) is a component functioning as a lower application layer for receiving order information from the customer and for transmitting received order information to PM 203. An AGW 202 can, for example, comprise three information processing terminals.

A Position Manager (PM) 203 is a component comprising, for example, three information processing terminals and three databases (DBs) provided to the information processing terminals. The respective PM terminals hold the order information received from AGW 202 in their own database, manage their own positions and transmit summary information to NPW 205. And it instructs to prosecute the covering order autonomously to Dealing Order Controller 204 based on the position summary information.

A Dealing Order Controller (DOC) 204 is a component comprising, for example, three information processing terminals. The DOC 204 issues a covering order to the transaction-covering bank 102 through the GW 209 in response to an instruction to execute the covering order from the PM 203. A plurality of transaction-covering banks 102 may exist depending on the types of transaction-covering bank and in this case, the transaction-covering bank to which the covering order is issued is determined based on the rate information of each transaction-covering bank provided by the PD 207.

A Net Position Watcher (NPW) 205 is a component comprising, for example, two information processing terminals. The NPW 205 receives the summary information from all PM terminals and generates net summary information for the system. The net summary information is transmitted to the NPC 206 together with each position summary.

A Net Position Controller (NPC) 206 is a component comprising, for example, two information processing terminals. The NPC 206 issues the order to respective PM terminals based on the net summary information received from the NPW 205 and the respective position summary information and adjusts the position between PM terminals.

A Price Distributer (PD) 207 manages the rate information presented by the transaction-covering bank and provides the rate information to the DOC 204 in response to the request from the DOC 204.

The afore-mentioned PM 203, DOC 204, NPW 205, NPC 206 and PD 207 function as a business logic application layer.

A gateway (GW) 209 is a component functioning as a gateway (upper application layer) to communicate with the transaction-covering bank and is comprised of, for example, two information processing terminals. The router 210 functions to provide a connection with the transaction-covering bank 102 through the network to the GW 209. The buses 211, 212, 213 and 214 provide mutual connections among the respective routers and components.

Figure 3:
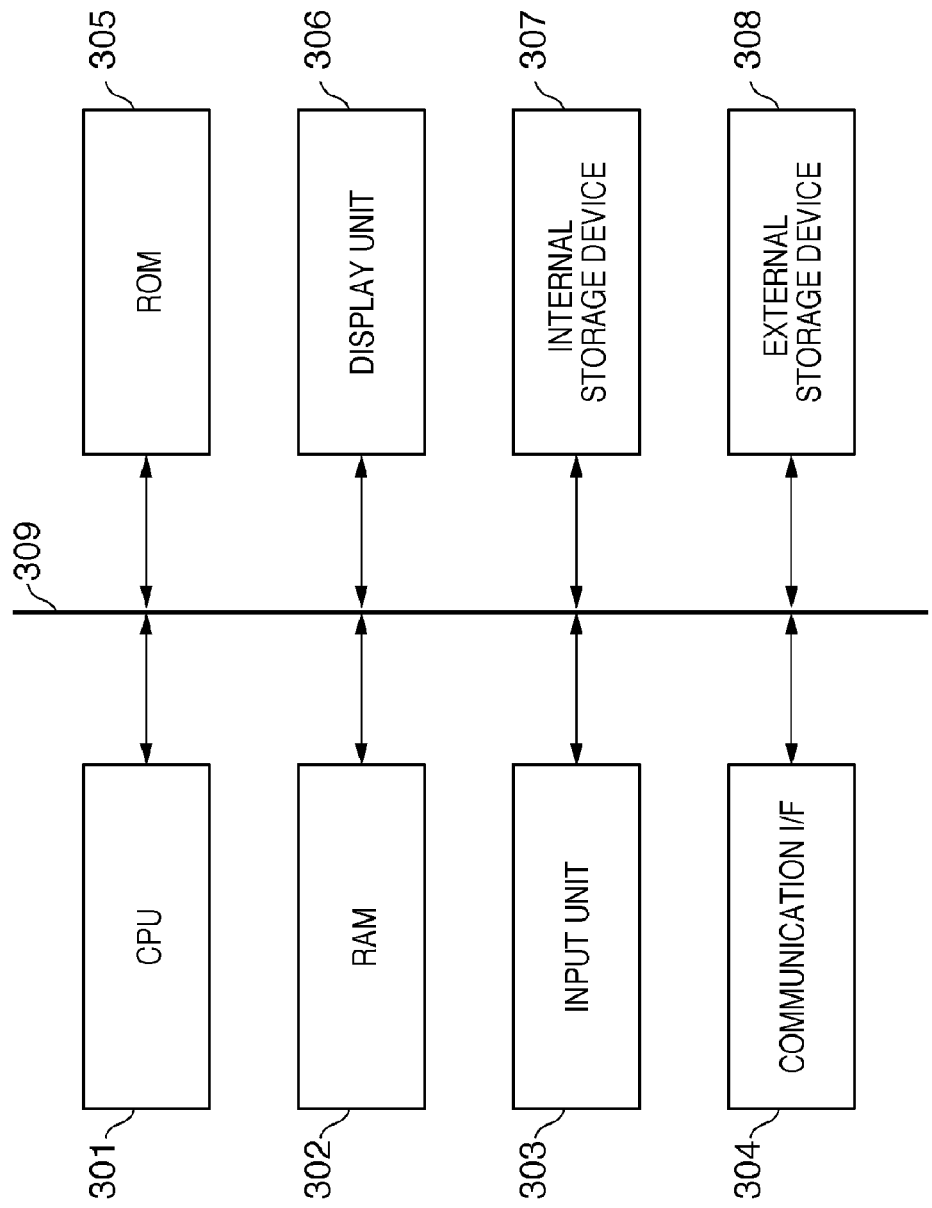
FIG. 3 is a diagram showing hardware of a information processing terminal corresponding to the embodiment of the present invention.

Next, the hardware construction of the information processing terminals forming the respective components of FIG. 2 with reference to FIG. 3.

In FIG. 3, the CPU 301 controls the information processing terminals using a program or data stored in RAM (Random Access Memory) 302 or ROM (Read Only Memory) 305 and executes processing for to allow the terminals to function as individual components. The RAM 302 has an area for reading the processing program stored in the internal storage device 307 and the information stored in the external storage device 308 and a work area for executing the various processing of the CPU 301.

The input unit 303 is the input means for receiving input from the manager of the information processing terminal and is composed of a key-board, a mouse and the like. The communications interface (I/F) 304 functions as an I/F for connecting to the bus 211 and the like. The ROM 305 stores a program (for example the boot program) for complete control of the information processing terminal. The display unit 306 is a display such as a display screen and comprises a CRT, LCD or the like.

Reference numeral 307 is the internal storage device, is mainly composed of a hard disc and stores programs or application data for executing processing to achieve the functions of the components which belong to the image processing terminal. The data stored herein is read out to a RAM 302, as necessary.

The external storage device 308 is the storage device used when information processing terminal functions as the PM terminal and store the order information received from AGW 202 as needed. The bus 309 provides a mutual connection among the above blocks.

Next, the various processes of the system 101 for margin trading will be explained.

Figure 4:
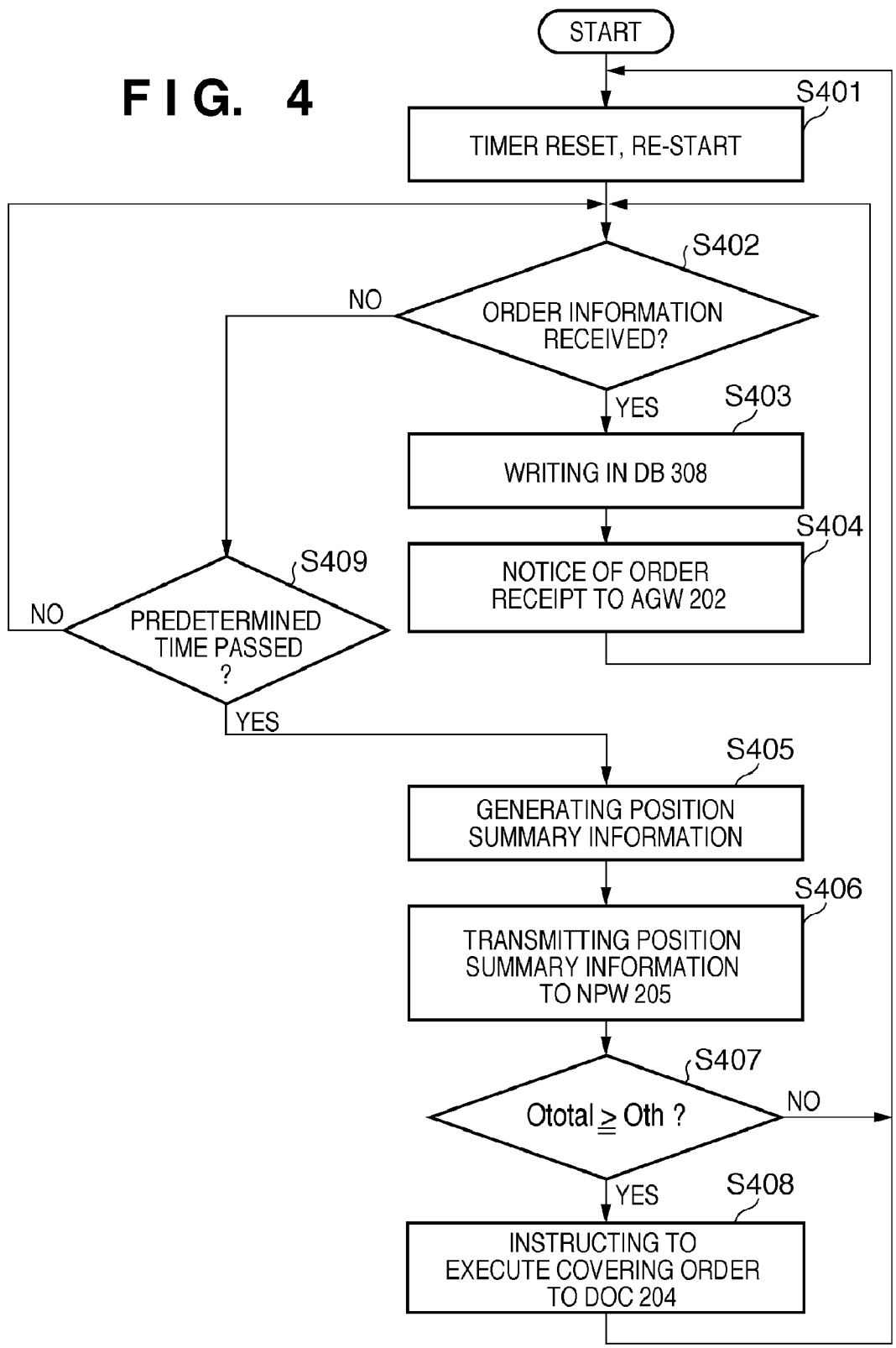
FIG. 4 is a flowchart showing an example of the processing executed in the PM terminal according to the embodiment of the present invention.

First, FIG. 4 is a flowchart showing the flow of processing executed in the respective PM terminals of the PM 203, one of the components forming the system 101 for margin trading. The processing corresponding to the flowchart of FIG. 4 is realized by reading out the processing program stored in the internal storage device 307 in the PM terminal to the RAM 302 and executing it using the CPU.

In FIG. 4, in step S401, a software timer in the CPU 301 is reset. Next, in step S402, it is determined whether order information has been received. If order information has been received ("YES" in step S402), processing proceeds to step S403. If it has not been received, ("NO" in step S402) processing proceeds to step to S409. In step S409, it is determined based on the timer whether a predetermined amount of time has passed. This predetermined amount of time may be selected to be one second. If the predetermined amount of time has passed ("YES" in step S409), the processing proceeds to step S405. If the predetermined amount of time has not passed ("NO" in step S409), processing returns to step S402 and receiving processing for order information continues.

Next, in step S403, the received order information is stored in the external storage device used for the database. When the database write is complete, processing proceeds to step S404 and acknowledgement of order receipt information is transmitted to AGW 202. After that, processing returns to S402 and the receiving processing of the order information continues. The AGW 202 transfers the received acknowledgment of order receipt information to the trading terminal 103 of the customer which transmitted the order information.

By the processing of steps S403 and S404, the respective PM terminals write to their own exclusive database and issue the acknowledgement of order receipt. Thus, because the acknowledgement receipt process of an order can be realized immediately, high response speed can be assured upon order receipt. On the other hand, because the order information received by respective PM terminals is stored in respective databases 308, it is difficult to know the total position of the system. In order to solve this problem, processing is executed subsequent to step S405.

In step S405, the position summary information is generated based on the order information stored in the database 308. This summary information is the sum of the order information received up until that time. In the present embodiment, it is assumed that the monetary amount of a buying order is a positive number, the monetary amount of a selling order is a negative number and the position summary information is calculated based on the sum of the order amount.

For example, when a buying order of $50,000 (+50,000), a buying order of $100,000(+100,000) and a selling order of $30,000(−30,000) arrive during one second, the net position information is 50,000+100,000−30,000=120,000. Thus, the position summary information so obtained is transmitted to the NPW 205 in step S406.

In the following step S407, the position summary information value Ototal and the threshold value Oth for determining whether the covering order is conducted are compared. The threshold value Oth can be set to, for example, $0.5M in response to the risk the company running the margin trading system is willing to accept.

When Ototal>=Oth ("YES" in step S407), processing proceeds to step S408. On the other hand, when Ototal<Oth ("NO" in step S407), processing proceeds to S401. In step S408, the instruction to execute the covering order is issued to the DOC 204 in response the value of the position summary information. And in the DOC 204, a covering order is issued in response to the instruction.

An example of the covering order will now be provided. For instance, let it be assumed that the value of the position summary information reaches $0.5M. In this case, as the sign of the position summary information is positive, the buying order will proceed. So, for the covering order, a selling order is issued as an order opposite to the given buying order. In this case, an order of an amount equal to $0.5M may be issued or a selling order of a fixed rate (for example, as 60% $0.3M) may be issued. If a selling order of $0.3M is issued, the value of the position summary would be lowered to $0.2M and the position summary would be approximately flat.

Figure 5:
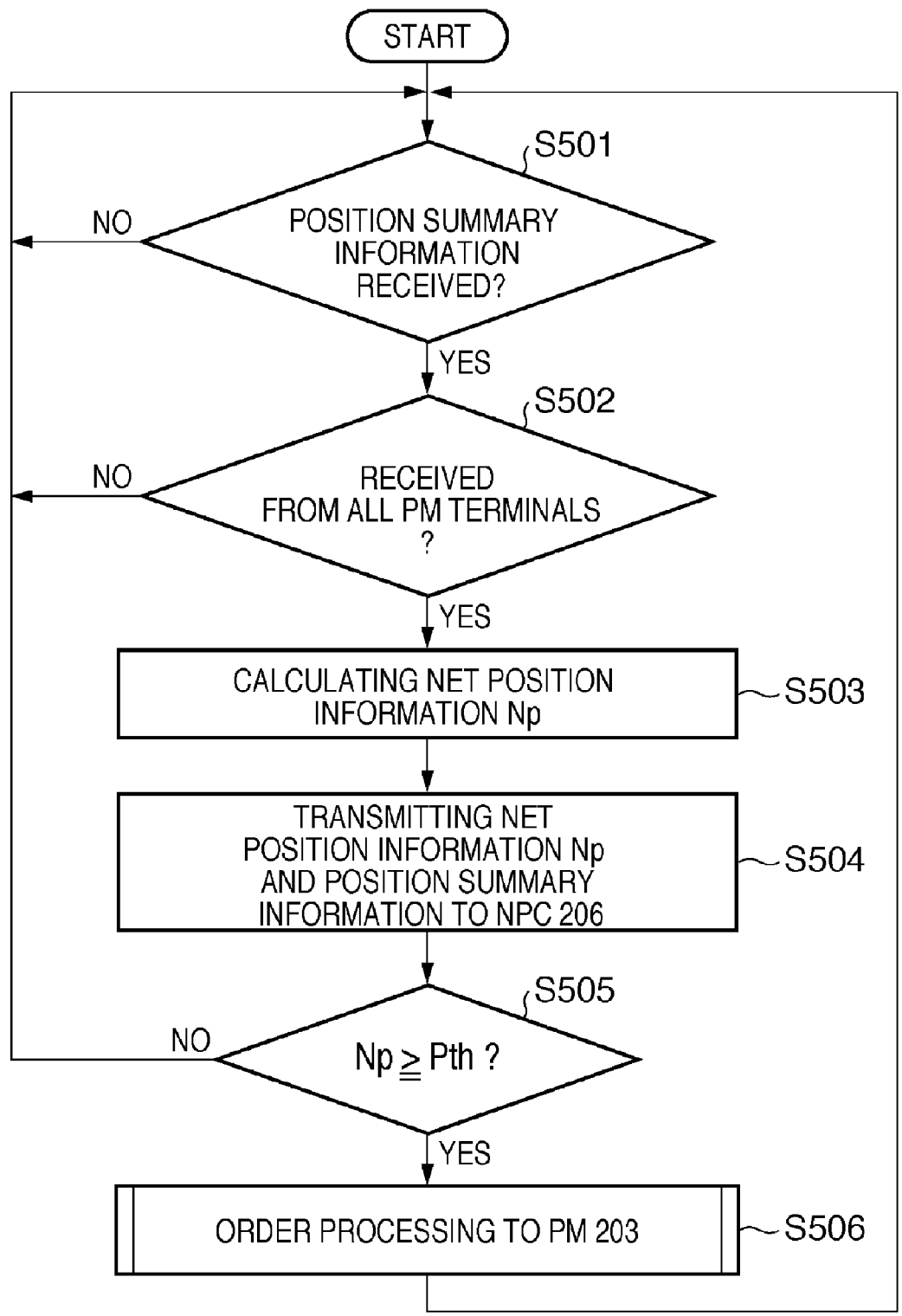
FIG. 5 is a flowchart showing an example of the processing executed in NPW 205 and NPC 206 according to the embodiment of the present invention.

Next, the processing executed in the NPW 205 and the NPC 206 will be explained with reference to FIG. 5. FIG. 5 is a flowchart showing the flow of the processing in the NPW 205 and the NPC 206 forming the system 101 for margin trading. The processing corresponding to the flowchart of FIG. 5 is realized by reading out the processing program stored in the internal storage device 307 to RAM 302 and executing it using the CPU 301.

First, in step S501, the NPW 205 receives the position summary information from the PM terminal. Next in step S502, the NPW determines whether it has received position summary information from all PM terminals. If the NPW has received position summary information from all PM terminals ("YES" in step S502), processing proceeds to S503.

In step S503, the NPW 205 sums up the received position summary information and calculates the net position information Np. This net position information can be calculated by summing up the position information. For example, assuming that three PM terminals are PM-1, PM-2 and PM-3, and they have notified their respective positions as +$0.1M, +$0.1M and +$0.4M, +$0.6M can be calculated as the position summary information.

Next, in step S504, the NPW 205 transmits the net position information Np and the position summary information to the NPC 206. In step S505, the NPC 206 compares the received net position information Np and the predetermined threshold value Pth. This threshold value Pth can be the same value as Oth for determining whether the covering order should be issued.

If Np>=Pth ("YES" in step S505), processing proceeds to step S506; on the other hand, if Np<Pth ("NO" in step S505), processing returns to step 501 and the NPW 205 receives the position summary information.

In the above example where the position summary information is $+0.6M, supposing that the threshold value Pth is $0.5M, because $0.6M>$0.5M and it is higher than the threshold value, processing proceeds to step S506.

In step S506, the NPC 206 issues an order to the respective terminals in response to the position summary of the PM terminal. The processing of this order will now be explained in detail with reference to FIG. 6A. When the order processing is complete, processing returns to step S501 and the NPW 205 receives the position summary information.

Next, the order processing to PM 203 executed by NPC 206 is explained with reference to FIG. 6A. FIG. 6A is a flowchart showing the flow of the processing executed in NPC 206 which is a component of the system 101 for margin trading. The processing corresponding to the flowchart of FIG. 6A is realized by reading the processing program stored in the internal storage device 307 into the RAM 302 and executing it using the CPU 301.

First, in step S601, the PM terminal having the maximum position summary information is determined. In this case, the absolute value of the net position information is taken. That is, if the respective values are +$0.5M and −$0.7M, −$0.7M is larger than +$0.5M. Order processing will now be explained with reference to the example shown in FIG. 7A.

FIG. 7A shows an example of position summary information, net summary information and the threshold value Pth received from respective PM terminals PM-1 to PM-3. In this case, the position summary information of PM-1 and PM-2 are +$0.1M, the position summary information of PM-3 is +$0.4M, so the net summary information is the summed value, +$0.6M. Because the threshold value, Pth is $0.5M, the net summary information is greater than the threshold value Pth.

In this situation, in the step S601, the PM terminal having the maximum value can be determined to be PM-3.

Next, in step S602, the opposite order for canceling the position summary information of the respective terminals is issued to the remaining PM terminals. That is, in the example of FIG. 7A, a selling order of $0.1M is issued to PM-1 and PM-2. Here, the opposite order may not have a value so as to cancel the respective position summary information completely but may have a value such that the position summary information of the PM terminal subject to processing in step S603 is higher than the threshold value.

In the following step S603, the further opposite order to the opposite order issued in step S602, having a number of orders so as to cancel the number of orders in step S602, is issued to the PM terminal having the maximum position summary information determined in step S601. In the example of FIG. 7A, a buying order is issued to PM-3.

Order information based on the order processing in steps S602 and S603 is treated as the order information received by the respective PM terminals in step S402. When the order information is received from the NPC 206 in step S402, acknowledgement of order receipt is transmitted to the NPC 206 not the AGW 202.

As a result of this, the position summary information of respective terminals is changed. That is, order information for the entire system is directed at one terminal; the terminal PM-3 to which all orders are directed can issue instructions to execute covering orders to the DOC 204 through the processing in steps S497 and S408.

Thus, by using the NPW 205 and the NPC 206, covering orders can be automatically issued as needed by directing the orders to a single PM terminal.

In the example of FIG. 7A, the case is described wherein all position summary information in each terminal has the same sign. However, there is a case where either selling proceeds (deviated to negative) or buying proceeds (deviated to positive), terminal by terminal. In such a case, in order to reduce the risk, by executing a so called "crossing order", fluctuations in the positions of respective terminals can be absorbed.

For example, when the position summary information of PM-1 is —$0.1M, the position summary information of PM-2 is −$0.2M and the position summary information of PM-3 is +$0.4M, the total selling order is $0.3M and the total buying order is $0.4M. In this case, there is a total risk of $0.7M, that is, a selling risk of $0.3M and a buying risk of $0.4M. However, from the viewpoint of net position, only a buying order of $0.1M proceeds.

In such a situation, an opposite order of the same amount is issued to some PM terminal in order to reduce risk and increase profit and the total position is made to be flat. That is, buy crossing orders of $0.1M and $0.2M are issued to PM-1 and PM-2 respectively and a sell crossing order of $0.3M is issued to PM-3.

With these crossing orders, the position summary information of PM-1 and PM-2 becomes 0 and the position summary information of PM-3 becomes $0.1M which is equal to the net position information and the risk the system is willing to bear.

When the signs of the position summary information are not equal, the processing of FIG. 6A may be executed after issuance of the crossing order.

In the above explanation, while in step S601 of FIG. 6A, a PM terminal having the maximum position summary information is determined, the selected terminal may not necessarily be the PM terminal having the maximum position summary information. For example, any of plurality of PM terminals including the PM terminal having the minimum position summary information may be determined. In this case, in the step S602, following the step S601, an opposite order is issued to the terminals other than that determined in step S601; and in step S603, an order is issued to the terminal determined in step S601 in order to cancel the opposite order.

In still another case, the processing of steps S407 and S408 of FIG. 4 may not be executed by a PM terminal. In this case, the covering order can be issued by the NPC 206. That is, the processing according to FIG. 6B can be executed instead of that according to FIG. 6A.

Figure 6B:
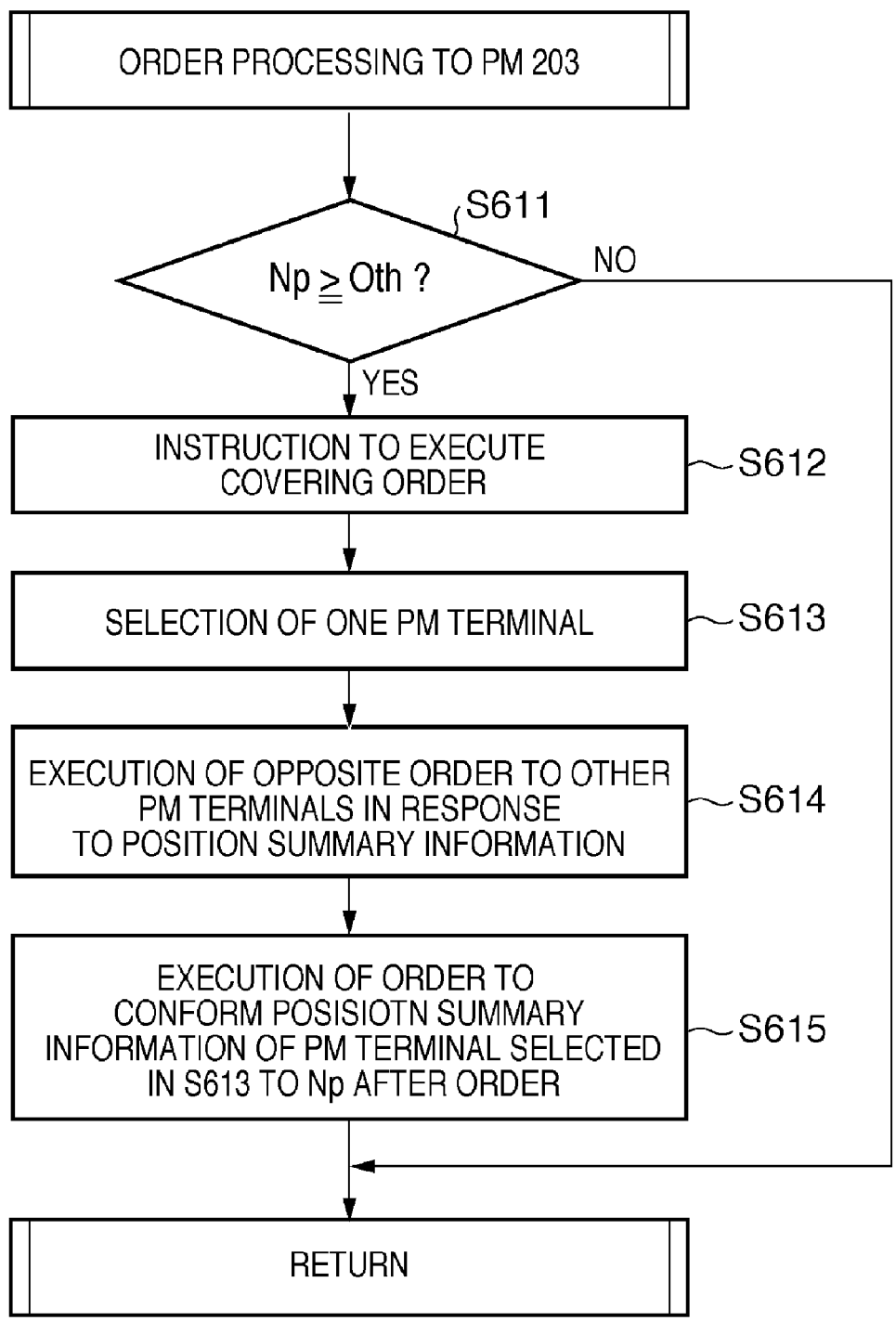
FIG. 6B a flowchart showing another example of the processing executed in NPC 206 according to the embodiment of the present invention.

In the flowchart of FIG. 6B, in step S611, the net position information Np received from the NPW 205 is compared with the threshold value Oth for determining whether the covering order is issued. When the net position information Np is greater than the threshold value Oth ("YES" in step S611), processing proceeds to step S612. In contrast, when the net position information Np is smaller than the threshold value Oth ("NO" in step S611), processing is complete.

In step S612, the instruction to execute the covering order based on the net position information Np is issued to the DOC 204. The DOC 204 issued the covering order in response to this instruction. The contents of the covering order is the same as that explained in step S408 of FIG. 4 and an explanation here will be omitted. By this covering order processing, the value of the net position information Np is decreased by the amount of the covering order.

In the following step S613, one PM terminal is selected among a plurality of PM terminals comprising the PM 203. In the following step S614, an opposite order is issued to a PM terminal other than that selected in step S613 to cancel the position summary of the respective terminals. The processing here is same as that in step S602 of FIG. 6A. It will be explained with reference to the example of FIG. 7A; it is assumed that the PM terminal selected in step S613 is PM-1, that in step S614, opposite orders of −$0.1M and −$0.4M are issued to PM-2 and PM-3, respectively and that the position summary information of respective terminals cancel.

In the following step S615, order processing is executed for conforming the position summary information of the PM terminal selected in step S613 to the value of the net position information Np after a covering order. For example, when the net position information Np is +$0.6M and the covering order is −$0.3M, the net position information Np after the covering order is +$0.3M. And so, in step S613, order processing of +$0.2M is executed on PM-1 for conforming the position summary of PM-1 to the net summary information Np after the covering order. By this processing, the respective position summary information of PM-1, PM-2 and PM-3 becomes +$0.3M, 0 and 0, respectively. According to the above processing, the same position summary situation as that of FIGS. 4 and 6A can be realized.

Due to the architecture of the system for margin trading of the present embodiment, the respective PM terminals comprising the PM 203 can issue the acknowledgement of order receipt by merely completing write to their respective databases. Therefore, even when the number of terminals is increased or when terminals are geographically dispersed, the response speed of acknowledgement receipt is not decreased as with the prior art. Thus, extensibility of the system can be obtained with the present invention.

As the position of the total system is centrally controlled by the NPW 205 or the NPC 206, the risk caused by not writing in the common database in real time can be minimized. Central control by the NPW 205 or the NPC 206 does not require real time response of acknowledgement receipt, so the load of the system can be small.

The advantage of the system for margin trading according to the present embodiment will be explained concretely by comparing it with the prior art.

Figure 8:
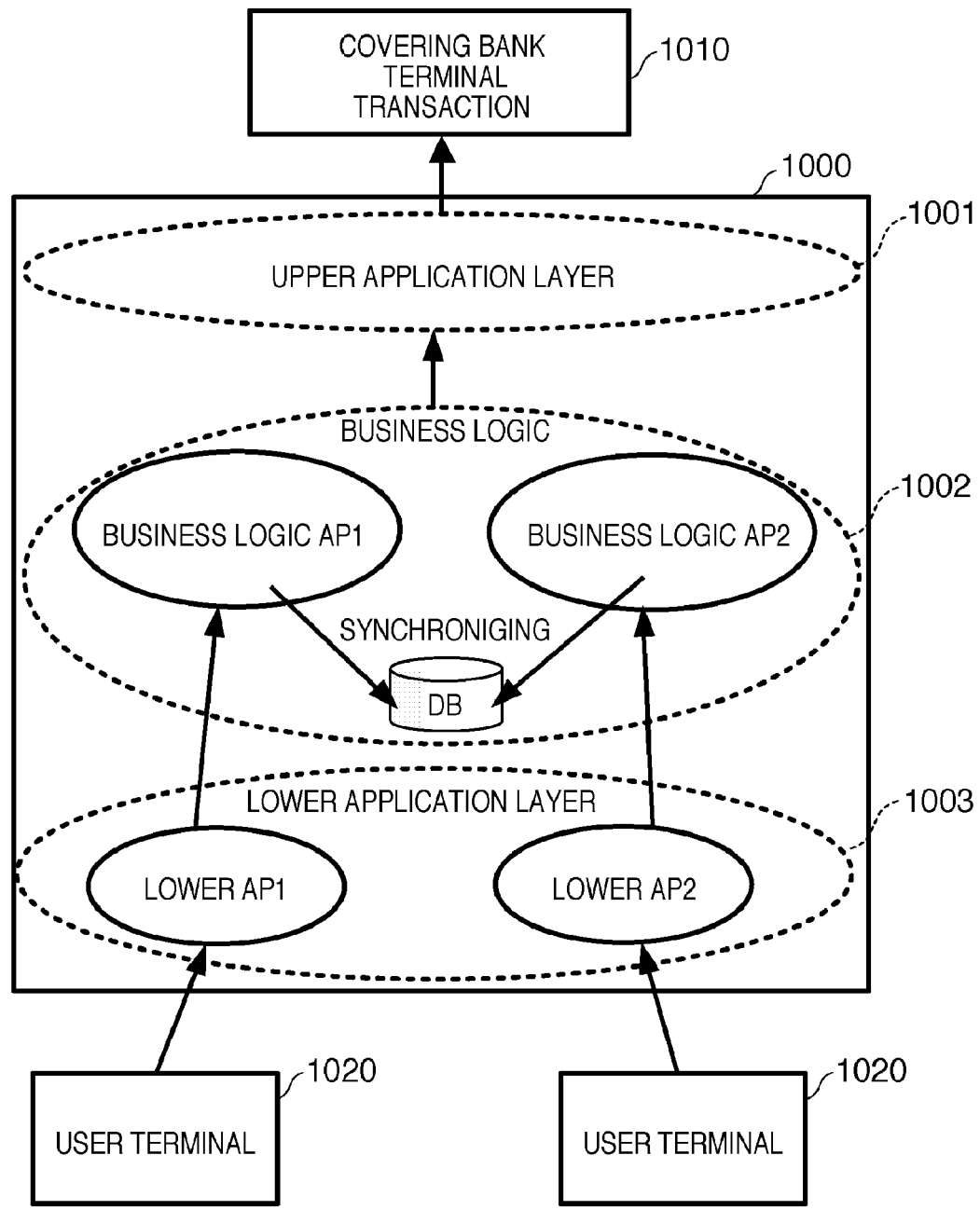
FIG. 8 is a diagram showing the construction of the existing margin trading system.

For example, in the construction explained with reference to FIG. 8, let it be assumed that ten orders per second are received by both of two terminals (AP1, AP2) forming the business logic 1002. In this case, as AP1 and AP2 write to their respective databases one by one, database write processing is executed at a rate of 20 times per second. As the number of terminals forming the business logic is further increased, the rate of database write processing is also increased by 10 times the number of terminals. Thus, the number of receipts of order information (the number of trades) is in proportional to the number of database write processing.

In contrast with this, in the system construction according to the present embodiment, even if 10 orders are input per second to PM terminals PM-1 to PM-3 for receiving order information, position summary information is only transmitted once per second from a given PM terminal to the NPW 205. The number of transmissions of the position summary information is always fixed regardless of the number of orders processed in a given PM terminal. Accordingly, the NPW 205 processes the same number of the position summaries as that of all other PM terminals; even if the number of PM terminals is increased, the increase in the amount of processing is proportional to the increase in the number of terminals and the increase in the number of trades has no relation to the amount of processing.

As mentioned above, in prior art systems, as the processing load of processing for obtaining position information of the total system increases proportionately as the number of trades or the number of terminals of the business logic is increased, the extensibility of the system is impeded and the response speed of order processing is degraded. In contrast with this, in the present embodiment, an increase of the number of the trades relative to the processing required to obtain position information of the total system can be negligible and attention need be paid only to increases in the number of terminals. So, it is possible to have system extensibility. Further, because the acknowledgement receipt of orders is completed within the PM terminal, the response speed is not reduced. If the number of terminals becomes insufficient, the extensibility of the system allows the number of terminals to be increased.

OTHER EMBODIMENTS

A computer can execute the processing as explained above (for example, the processing according to the flowchart shown in the embodiment) by storing it as a program in a storage medium, such as CD-R, CD-ROM, DVD-ROM or MO readable by the computer and reading (installing or copying) the program stored in this storage medium using the computer. Accordingly, it is clear that the computer program and the storage media are also within the scope of the invention.

The invention claimed is:

1. A margin trading system connectable to a plurality of trading terminals and a transaction-covering bank terminal via a network, comprising:
   a receiving apparatus that receives order information from said plurality of trading terminals;
   a plurality of processing apparatuses, each processing apparatus comprising an external storage device; a writing unit configurable to write the received order information to the external storage device; a first transmitting unit configurable to transmit an order receipt notification to said receiving apparatus in response to the completion of write of the received order information to the external storage device; and a calculating unit configurable to calculate a first sum value of the order information stored in the external storage device per predetermined time period;

a calculation apparatus that obtains the first sum values each of which was calculated by each processing apparatus and calculates a second sum value based on the obtained first sum values; and an ordering apparatus, comprising a comparing unit configurable to compare the second sum value calculated by said calculation apparatus with a threshold value; a determination unit configurable to determine a first processing apparatus among the plurality of processing apparatuses, when the second sum value is not less than the threshold value; a creation unit configurable to create first order information which cancels the first sum value of the processing apparatus other than the first processing apparatus and to create second order information which cancels the first order information; and a second transmitting unit configurable to transmit the first order information to the processing apparatus other than the first processing apparatus and to transmit the second order information to the first processing apparatus; and a cover-ordering apparatus that conducts covering orders to the transaction-covering bank terminal, wherein said receiving apparatus transmits the order receipt notification received from said processing apparatus to the corresponding trading terminal, the first transmitting unit is further configurable to compare the first sum value with the threshold value and, when the first sum value is not less than the threshold value, transmits an instruction of the covering order to said cover-ordering apparatus, and said cover-ordering apparatus transmits covering order information of predetermined money amount to the transaction-covering bank terminal in response to the instruction of the cover ordering.

2. A margin trading system connectable to a plurality of trading terminals and a transaction-covering bank terminal via a network, comprising:

a receiving apparatus that receives order information from said plurality of trading terminals;

a plurality of processing apparatuses, each processing apparatus comprising an external storage device; a writing unit configurable to write the received order information to the external storage device; a first transmitting unit configurable to transmit an order receipt notification to said receiving apparatus in response to the completion of write of the received order information to the external storage device; and a calculating unit configurable to calculate a first sum value of the order information stored in the external storage device per predetermined time period;

a calculation apparatus that obtains the first sum values each of which was calculated by each processing apparatus and calculates a second sum value based on the obtained first sum values;

an ordering apparatus, comprising a comparing unit configurable to compare the second sum value calculated by said calculation apparatus with a threshold value; and a covering order instructing unit configurable to instruct the covering order when the second sum value is not less than the threshold value; and a cover ordering apparatus that sends a covering order to the transaction-covering bank terminal in response to the covering order, wherein said ordering apparatus further comprises an ordering unit configurable to order each processing apparatus such that the first sum value of a first processing unit among said plurality of the processing apparatuses becomes equal to the second sum value after the covering order and the first sum values of the processing apparatus other than the first processing unit is canceled.

3. A margin trading system according to claim 1 or 2, wherein the order information includes buying order information and selling order information; and the first sum value is calculated based on the sum value of the amount of the order of respective processing apparatuses when a positive sign is given to the amount of a buying order and a negative sign is given to the amount of a selling order.

4. A computer, comprising a program, wherein the program instructs said computer to function as a margin trading system connectable to a plurality of trading terminals and a transaction-covering bank terminal via a network, comprising:

a receiving apparatus that receives order information from said plurality of trading terminals;

a plurality of processing apparatuses, each processing apparatus comprising an external storage device; a writing unit configurable to write the received order information to the external storage device; a first transmitting unit configurable to transmit an order receipt notification to said receiving apparatus in response to the completion of write of the received order information to the external storage device; and a calculating unit configurable to calculate a first sum value of the order information stored in the external storage device per predetermined time period;

a calculation apparatus that obtains the first sum values each of which was calculated by each processing apparatus and calculates a second sum value based on the obtained first sum values;

an ordering apparatus, comprising a comparing unit configurable to compare the second sum value calculated by said calculation apparatus with a threshold value; a determination unit configurable to determine a first processing apparatus among the plurality of processing apparatuses, when the second sum value is not less than the threshold value; a creation unit configurable to create first order information which cancels the first sum value of the processing apparatus other than the first processing apparatus and to create second order information which cancels the first order information; and a second transmitting unit configurable to transmit the first order information to the processing apparatus other than the first processing apparatus and to transmit the second order information to the first processing apparatus; and a cover-ordering apparatus that conducts covering orders to the transaction-covering bank terminal, wherein said receiving apparatus transmits the order receipt notification received from said processing apparatus to the corresponding trading terminal, the first transmitting unit is further configurable to compare the first sum value with the threshold value and, when the first sum value is not less than the threshold value, transmits an instruction of the covering order to said cover-ordering apparatus, and said cover-ordering apparatus transmits covering order information of predetermined money amount to the transaction-covering bank terminal in response to the instruction of the cover ordering.

5. A storage medium that stores a computer program for allowing a computer to function as a margin trading system connectable to a plurality of trading terminals and a transaction-covering bank terminal via a network, comprising:

a receiving apparatus that receives order information from said plurality of trading terminals;

a plurality of processing apparatuses, each processing apparatus comprising an external storage device; a writing unit configurable to write the received order information to the external storage device; a first transmitting unit configurable to transmit an order receipt notification to said receiving apparatus in response to the completion of write of the received order information to the external storage device; and a calculating unit configurable to calculate a first sum value of the order information stored in the external storage device per predetermined time period;

a calculation apparatus that obtains the first sum values each of which was calculated by each processing apparatus and calculates a second sum value based on the obtained first sum values; and an ordering apparatus, comprising a comparing unit configurable to compare the second sum value calculated by said calculation apparatus with a threshold value; a determination unit configurable to determine a first processing apparatus among the plurality of processing apparatuses, when the second sum value is not less than the threshold value; a creation unit configurable to create first order information which cancels the first sum value of the processing apparatus other than the first processing apparatus and to create second order information which cancels the first order information; and a second transmitting unit configurable to transmit the first order information to the processing apparatus other than the first processing apparatus and to transmit the second order information to the first processing apparatus; and a cover-ordering apparatus that conducts covering orders to the transaction-covering bank terminal, wherein said receiving apparatus transmits the order receipt notification received from said processing apparatus to the corresponding trading terminal, the first transmitting unit is further configurable to compare the first sum value with the threshold value and, when the first sum value is not less than the threshold value, transmits an instruction of the covering order to said cover-ordering apparatus, and said cover-ordering apparatus transmits covering order information of predetermined money amount to the transaction-covering bank terminal in response to the instruction of the cover ordering.

6. A computer, comprising a program, wherein the program instructs said computer to function as a margin trading system connectable to a plurality of trading terminals and a transaction-covering bank terminal via a network, comprising:

a receiving apparatus that receives order information from said plurality of trading terminals;

a plurality of processing apparatuses, each processing apparatus comprising an external storage device; a writing unit configurable to write the received order information to the external storage device; a first transmitting unit configurable to transmit an order receipt notification to said receiving apparatus in response to the completion of write of the received order information to the external storage device; and a calculating unit configurable to calculate a first sum value of the order information stored in the external storage device per predetermined time period;

a calculation apparatus that obtains the first sum values each of which was calculated by each processing apparatus and calculates a second sum value based on the obtained first sum values; and an ordering apparatus, comprising a comparing unit configurable to compare the second sum value calculated by said calculation apparatus with a threshold value; a determination unit configurable to determine a first processing apparatus among the plurality of processing apparatuses, when the second sum value is not less than the threshold value; a creation unit configurable to create first order information which cancels the first sum value of the processing apparatus other than the first processing apparatus and to create second order information which cancels the first order information; and a second transmitting unit configurable to transmit the first order information to the processing apparatus other than the first processing apparatus and to transmit the second order information to the first processing apparatus; and a cover-ordering apparatus that conducts covering orders to the transaction-covering bank terminal, wherein said receiving apparatus transmits the order receipt notification received from said processing apparatus to the corresponding trading terminal, the first transmitting unit is further configurable to compare the first sum value with the threshold value and, when the first sum value is not less than the threshold value, transmits an instruction of the covering order to said cover-ordering apparatus, said cover-ordering apparatus transmits covering order information of predetermined money amount to the transaction-covering bank terminal in response to the instruction of the cover ordering, the order information includes buying order information and selling order information, and the first sum value is calculated based on the sum value of the amount of the order of respective processing apparatuses when a positive sign is given to the amount of a buying order and a negative sign is given to the amount of a selling order.

7. A storage medium that stores a computer program allowing a computer to function as a margin trading system connectable to a plurality of trading terminals and a transaction-covering bank terminal via a network, comprising:

a receiving apparatus that receives order information from said plurality of trading terminals;

a plurality of processing apparatuses, each processing apparatus comprising an external storage device; a writing unit configurable to write the received order information to the external storage device; a first transmitting unit configurable to transmit an order receipt notification to said receiving apparatus in response to the completion of write of the received order information to the external storage device; and a calculating unit configurable to calculate a first sum value of the order information stored in the external storage device per predetermined time period;

a calculation apparatus that obtains the first sum values each of which was calculated by each processing apparatus and calculates a second sum value based on the obtained first sum values; and an ordering apparatus, comprising a comparing unit configurable to compare the second sum value calculated by said calculation apparatus with a threshold value; a determination unit configurable to determine a first processing apparatus among the plurality of processing apparatuses, when the second sum value is not less than the threshold value; a creation unit configurable to create first order information which cancels the first sum value of the processing apparatus other than the first processing apparatus and to create second order information which cancels the first order information; and a second transmitting unit configurable to transmit the first order information to the processing apparatus other than the first processing apparatus and to transmit the second order information to the first processing apparatus; and a cover-ordering apparatus that conducts covering orders to the transaction-covering bank terminal, wherein said receiving apparatus transmits the order receipt notification received from said processing apparatus to the corresponding trading terminal, the first transmitting unit is further configurable to compare the first sum value with the threshold value and, when the first sum value is not less than the threshold value, transmits an instruction of the covering order to said cover-ordering apparatus, said cover-ordering apparatus transmits covering order information of predetermined money amount to the transaction-covering bank terminal in response to the instruction of the cover ordering, the order information includes buying order information and selling order information, and the first sum value is calculated based on the sum value of the amount of the order of respective processing apparatuses when a positive sign is given to the amount of a buying order and a negative sign is given to the amount of a selling order.

8. A computer, comprising a program, wherein the program instructs said computer to function as a margin trading system connectable to a plurality of trading terminals and a transaction-covering bank terminal via a network, comprising:

a receiving apparatus that receives order information from said plurality of trading terminals;

a plurality of processing apparatuses, each processing apparatus comprising an external storage device; a writing unit configurable to write the received order information to the external storage device; a first transmitting unit configurable to transmit an order receipt notification to said receiving apparatus in response to the completion of write of the received order information to the external storage device; and a calculating unit configurable to calculate a first sum value of the order information stored in the external storage device per predetermined time period;

a calculation apparatus that obtains the first sum values each of which was calculated by each processing apparatus and calculates a second sum value based on the obtained first sum values;

an ordering apparatus, comprising a comparing unit configurable to compare the second sum value calculated by said calculation apparatus with a threshold value; and a covering order instructing unit configurable to instruct the covering order when the second sum value is not less than the threshold value; and a cover ordering apparatus that sends a covering order to the transaction-covering bank terminal in response to the covering order, wherein said ordering apparatus further comprises an ordering unit configurable to order each processing apparatus such that the first sum value of a first processing unit among said plurality of the processing apparatuses becomes equal to the second sum value after the covering order and the first sum values of the processing apparatus other than the first processing unit is canceled.

9. A storage medium that stores a computer program for allowing a computer to function as a margin trading system connectable to a plurality of trading terminals and a transaction-covering bank terminal via a network, comprising:

a receiving apparatus that receives order information from said plurality of trading terminals;

a plurality of processing apparatuses, each processing apparatus comprising an external storage device; a writing unit configurable to write the received order information to the external storage device; a first transmitting unit configurable to transmit an order receipt notification to said receiving apparatus in response to the completion of write of the received order information to the external storage device; and a calculating unit configurable to calculate a first sum value of the order information stored in the external storage device per predetermined time period;

a calculation apparatus that obtains the first sum values each of which was calculated by each processing apparatus and calculates a second sum value based on the obtained first sum values;

an ordering apparatus, comprising a comparing unit configurable to compare the second sum value calculated by said calculation apparatus with a threshold value; and a covering order instructing unit configurable to instruct the covering order when the second sum value is not less than the threshold value; and a cover ordering apparatus that sends a covering order to the transaction-covering bank terminal in response to the covering order, wherein said ordering apparatus further comprises an ordering unit configurable to order each processing apparatus such that the first sum value of a first processing unit among said plurality of the processing apparatuses becomes equal to the second sum value after the covering order and the first sum values of the processing apparatus other than the first processing unit is canceled.

10. A computer, comprising a program, wherein the program instructs said computer to function as a margin trading system connectable to a plurality of trading terminals and a transaction-covering bank terminal via a network, comprising:

a receiving apparatus that receives order information from said plurality of trading terminals;

a plurality of processing apparatuses, each processing apparatus comprising an external storage device; a writing unit configurable to write the received order information to the external storage device; a first transmitting unit configurable to transmit an order receipt notification to said receiving apparatus in response to the completion of write of the received order information to the external storage device; and a calculating unit configurable to calculate a first sum value of the order information stored in the external storage device per predetermined time period;

a calculation apparatus that obtains the first sum values each of which was calculated by each processing apparatus and calculates a second sum value based on the obtained first sum values;

an ordering apparatus, comprising a comparing unit configurable to compare the second sum value calculated by said calculation apparatus with a threshold value; and a covering order instructing unit configurable to instruct the covering order when the second sum value is not less than the threshold value; and a cover ordering apparatus that sends a covering order to the transaction-covering bank terminal in response to the covering order, wherein said ordering apparatus further comprises an ordering unit configurable to order each processing apparatus such that the first sum value of a first processing unit among said plurality of the processing apparatuses becomes equal to the second sum value after the covering order and the first sum values of the processing apparatus other than the first processing unit is canceled, the order information includes buying order information and selling order information, and the first sum value is calculated based on the sum value of the amount of the order of respective processing apparatuses when a positive sign is given to the amount of a buying order and a negative sign is given to the amount of a selling order.

11. A storage medium that stores a computer program allowing a computer to function as a margin trading system connectable to a plurality of trading terminals and a transaction-covering bank terminal via a network, comprising:

a receiving apparatus that receives order information from said plurality of trading terminals;

a plurality of processing apparatuses, each processing apparatus comprising an external storage device; a writing unit configurable to write the received order information to the external storage device; a first transmitting unit configurable to transmit an order receipt notification to said receiving apparatus in response to the completion of write of the received order information to the external storage device; and a calculating unit configurable to calculate a first sum value of the order information stored in the external storage device per predetermined time period;

a calculation apparatus that obtains the first sum values each of which was calculated by each processing apparatus and calculates a second sum value based on the obtained first sum values;

an ordering apparatus, comprising a comparing unit configurable to compare the second sum value calculated by said calculation apparatus with a threshold value; and a covering order instructing unit configurable to instruct the covering order when the second sum value is not less than the threshold value; and a cover ordering apparatus that sends a covering order to the transaction-covering bank terminal in response to the covering order, wherein said ordering apparatus further comprises an ordering unit configurable to order each processing apparatus such that the first sum value of a first processing unit among said plurality of the processing apparatuses becomes equal to the second sum value after the covering order and the first sum values of the processing apparatus other than the first processing unit is canceled, the order information includes buying order information and selling order information, and the first sum value is calculated based on the sum value of the amount of the order of respective processing apparatuses when a positive sign is given to the amount of a buying order and a negative sign is given to the amount of a selling order.

* * * * *